Figure 1:
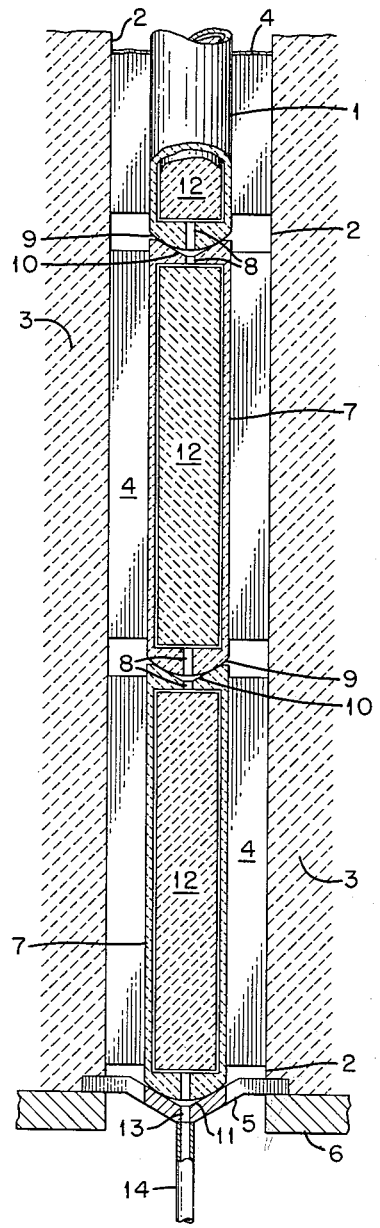

Dec. 17, 1963  W. T. FURGERSON  3,114,693
VENTED FUEL ELEMENT FOR GAS-COOLED NEUTRONIC REACTORS
Filed July 12, 1961

INVENTOR.
William T. Furgerson
BY
ATTORNEY 3,114,693
VENTED FUEL ELEMENT FOR GAS-COOLED
NEUTRONIC REACTORS
William T. Furgerson, Del Mar, Calif., assignor to the United States of America as represented by the United States Atomic Energy Commission
Filed July 12, 1961, Ser. No. 123,599
1 Claim. (Cl. 204—193.2)

This invention relates generally to the neutronic reactor art, and more particularly to vented fuel elements for gas-cooled neutronic reactors.

During operation, the fissionable fuel of neutronic reactors produces highly radioactive fission products, many of which are gaseous. Since the fissioning fuel must be cooled, a coolant is circulated past the fuel in heat transfer relationship therewith. In order to avoid contamination of the equipment external to the reactor through which the coolant is passed (e.g., turbines, heat exchangers, steam generators, and piping), these fission products must be retained within the fuel. Generally, containment is accomplished by encapsulating the fuel in a non-porous substance, such as steel, aluminum, or zirconium, and great precautions are taken in preparing the fuel to insure a high degree of fission-product retention within the crystalline structure of the fuel.

Fission-product retention in this manner is disadvantageous in several respects: First, the cost of fuel preparation is increased when fission-product retention is an important criterion. Secondly, refractory materials, such as graphite, which are highly advantageous in terms of absorption cross section, low cost, chemical inertness, and ability to operate at high temperatures cannot be used for encapsulating purposes because of their porosity. Thirdly, encapsulated fuel elements, being sealed, may be subjected to large differential pressures across their cladding, which necessitates a strong material for use as the cladding. Fourthly, cracks or holes, which may develop in the cladding, can allow the leakage of fission products and contaminate the entire reactor system.

Above and beyond the problems associated with fission-product retention, fission products are of themselves deleterious in an operating reactor. They are, generally, highly absorptive of neutrons and, thus, constitute an economic burden on operation of a reactor.

In the gas-cooled area of the neutronic reactor art, the above disadvantages are particularly pronounced because of the inability of using permeable refractory cladding material. This detracts greatly from one advantage of gas-cooled reactors, that of high temperature operation.

It is, therefore, the general object of the present invention to provide a reactor fuel element in which a porous refractory material can be used as a cladding.

Another object of the invention is the provision of a fuel element in which large differential pressures across the cladding cannot exist.

A further object of the invention is to provide a fuel element for which fuel may be prepared without regard for fission-product retention.

A further object of the invention is to provide a fuel element in which cracks in the cladding can develop without contaminating the reactor coolant.

A still further object of the invention is to provide a fuel element and associated system from which gaseous fission products are continuously withdrawn during operation of the reactor.

Figure 2:
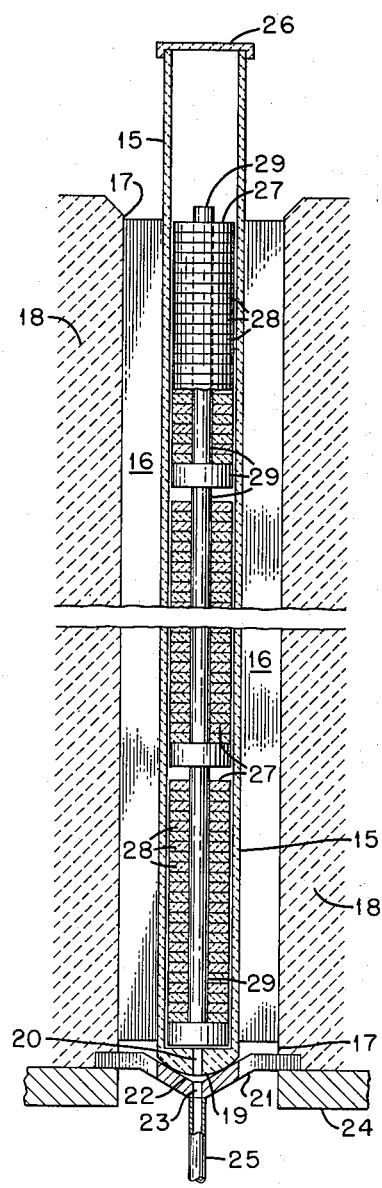

Other objects of the invention will become apparent from an examination of the following description of the invention and the drawings appended thereto, wherein:

FIGURE 1 is a vertical cross section of a fuel-coolant channel of a neutronic reactor containing a stacked column of removable fuel elements which are adapted to meet the above objects; and FIGURE 2 is a similar vertical cross section of a fixed capsule with removable fuel contained therein.

In accordance with the present invention, the above-listed objects are attained by providing, in a gas-cooled reactor, a hollow, porous-walled fuel element filled with a fissionable fuel and provided with an outlet port through its wall. In operation in a reactor the element is connected, through its outlet port, to the vacuum side of a pump which causes a portion of the coolant gas flowing over the exterior of the surface of the element to be drawn through the porous walls thereof and out through the outlet port. This continuous purging flow sweeps away gaseous fission products as they are released by the fissioning fuel.

The above-described fuel element is advantageous in several respects to which prior fuel elements have been disadvantageous. First, since a permeable rather than an impermeable capsule is used, many refractory materials such as graphite, beryllium oxide, aluminum oxide, and magnesium oxide may be used; fissionable fuel may be prepared with total disregard for fission-product-retention properties; high differential pressures do not exist across the capsule wall; and, cracks which may develop in the capsule wall are not a serious matter since the inward flow of gas tends to prevent the escape of fission products.

Although, as is stated above, the fuel may be prepared without regard for fission-product retention, under certain circumstances complete removal of gaseous fission products may constitute a hazard to health and safety. Thus, it may then be desired that the fuel be coated to inhibit fission product release and thereby minimize the fission product accumulation exterior to the reactor.

To facilitate a better understanding of the invention, reference is made to the drawings which illustrate two embodiments thereof.

Referring first to FIGURE 1, which is a cross sectional view of removable fuel elements located within a single fuel-coolant channel of a gas-cooled reactor, a plurality of vertically-oriented cylindrical fuel elements 1 are stacked within a cylindrical channel 2, defined by graphite moderator 3. The elements are maintained co-axially within channel 2 by radially-extending spacers 4 and supported from below by a spider 5 which is carried by a steel, moderator-supporting grid 6.

Each fuel element 1 consists of a hollow, porous-walled graphite, or other suitable ceramic, capsule 7 provided with a vertically-oriented, centrally-located port or hole 8 at each end. The lower end 9 of each capsule is hemispherical in configuration and is adapted to form a gas tight seal when engaged by a conical seat 10 formed at the upper end of the element immediately below in the column. The lowermost element in the column is carried by a conical seat 11 which is provided at the center of support spider 6. Provided within each capsule 7 is a $UO_2$ fuel slug 12. (Other refractory fuels such as UC and $UC_2$ are equally suitable.)

Communicating with the interiors of the fuel capsules through a hole 13 provided in support spider 6 is an off gas line 14 which is connected to the inlet side of a pump (not shown).

In operation, a coolant gas, such as helium, is introduced into channel 2 at its lower extremity and is passed upwardly therethrough in heat transfer relationship with the exteriors of fuel capsules 7. The interiors of the fuel capsules are maintained, by means of the externally-disposed pump, at a pressure sufficiently lower than the pressure in channel 2 to cause a portion of the coolant gas to pass inwardly through the porous capsule walls, downwardly through the fuel column, and out through off gas line 14. This continuous flow of gas purges the interiors of fuel capsules 7 from gaseous fission products, which may be removed from the gas at an external location.

Turning now to FIGURE 2, which is a cross sectional view of a fixed capsule located within a fuel-coolant channel of a gas-cooled reactor, a single, hollow, cylindrical graphite capsule 15 is located centrally, by means of radially extending fins or spacers 16, within a cylindrical channel 17 defined by graphite moderator 18. Capsule 15 is provided with a hemispherically-shaped lower end 19, which is penetrated by a central hole 20.

Supporting the capsule from beneath is a support spider 21, which is provided with a conical seat 22, a central hole 23, and is supported by a steel moderator-support grid 24. An off gas line 25 communicates with the interior of capsule 15 through holes 23 and 20 and is connected at its other end to the inlet side of a pump (not shown). The open top end of capsule 15 is provided with a gas tight cover 26.

The interior of the capsule is filled with a multiplicity of fuel clusters 27 which are removable through the open upper end of the capsule. Each fuel cluster 27 consists of a multiplicity of annular-shaped $UO_2$ fuel discs 28 which are carried by a graphite spool 29.

During reactor operation, a gaseous coolant, such as helium, is circulated upwardly through channel 17 in heat exchange relationship with the exterior of fuel capsule 15. The interior of capsule 15 is maintained at a pressure sufficiently lower than the pressure in channel 17 so as to cause a portion of the coolant gas to flow through the porous walls of the capsule into the interior thereof, from where it is withdrawn through off gas line 25. This continuous flow of gas purges the interior of the fuel capsule of gaseous fission products as they are released.

It will be noted that the embodiments of FIGURES 1 and 2 differ in that in the latter embodiment only the fuel is removed from the reactor and the capsule normally remains in a fixed location, while in the embodiment of FIGURE 1, the entire capsule is removed for refueling purposes.

It should be apparent that the embodiments described above are merely illustrative of the invention. Many changes can be made without departing from the spirit and scope of the invention embodied in these illustrations; therefore, the invention should be limited only by the claim appended hereto.

Having thus described the invention, what is claimed is:

In a neutronic reactor comprising a moderator structure penetrated by a multiplicity of vertically oriented channels, fissionable fuel disposed within said channels, and a gaseous coolant passing through said channels in heat exchange relationship with said fissionable fuel, the combination of a plurality of fuel elements arranged in end-abutting relationship to form a column of fuel elements in each of said channels, each of said fuel elements consisting of a hollow porous-walled capsule, and a single fissionable fuel slug disposed within said capsule, the lower end of each of said fuel elements being spherical in shape and provided with an axially oriented port, the upper end of each of said elements, except the uppermost element in a column, being provided with an axially-oriented port and an upwardly-diverging conical seat adapted to receive the spherical lower end of the element immediately above it in the column, the lowermost element being provided an outlet port; and means communicating with the interior of said capsules through the outlet port in said lower element, for causing a portion of said gaseous coolant to continuously pass through the porous walls of said capsules, downwardly through said column, and out through said outlet port.

References Cited in the file of this patent

UNITED STATES PATENTS

| | | |
|---|---|---|
| 2,782,158 | Wheeler | Feb. 19, 1957 |
| 2,879,216 | Hurwitz et al. | Mar. 24, 1959 |
| 3,010,889 | Fortescue et al. | Nov. 28, 1961 |
| 3,039,947 | Fortescue et al. | June 19, 1962 |

FOREIGN PATENTS

| | | |
|---|---|---|
| 850,015 | Great Britain | Sept. 28, 1960 |